United States Patent
Ye et al.

(10) Patent No.: US 11,615,605 B2
(45) Date of Patent: Mar. 28, 2023

(54) VEHICLE INFORMATION DETECTION METHOD, ELECTRONIC DEVICE AND STORAGE MEDIUM

(71) Applicant: Beijing Baidu Netcom Science and Technology Co., LTD, Beijing (CN)

(72) Inventors: Xiaoqing Ye, Beijing (CN); Xiao Tan, Beijing (CN); Hao Sun, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 16 days.

(21) Appl. No.: 17/349,055

(22) Filed: Jun. 16, 2021

(65) Prior Publication Data
US 2021/0312209 A1    Oct. 7, 2021

(30) Foreign Application Priority Data

Oct. 23, 2020   (CN) ................. 202011143311.5

(51) Int. Cl.
*G06K 9/00*    (2022.01)
*G06V 10/40*   (2022.01)
(Continued)

(52) U.S. Cl.
CPC ............ *G06V 10/40* (2022.01); *G06K 9/629* (2013.01); *G06T 7/50* (2017.01); *G06T 17/00* (2013.01);
(Continued)

(58) Field of Classification Search
CPC .......... G06V 10/40; G06K 9/629; G06T 7/50; G06T 17/00; G06T 2207/20081; G06T 2207/30252
See application file for complete search history.

(56) References Cited

U.S. PATENT DOCUMENTS

2020/0050900 A1*  2/2020  Schulter .............. G06N 3/02
2020/0066036 A1*  2/2020  Choi .................. G06T 15/10
(Continued)

FOREIGN PATENT DOCUMENTS

CN    110119698 A  *  8/2019  ......... G06K 9/00791
CN    110543858 A     12/2019
(Continued)

OTHER PUBLICATIONS

MLOD: A multi-view 3D object detection based on robust feature, Jian Deng et al., arXiv:1909.04163v1, Sep. 9, 2019, pp. 1-6 (Year: 2019).*

(Continued)

*Primary Examiner* — Jayesh A Patel
(74) *Attorney, Agent, or Firm* — Banner & Witcoft, Ltd.

(57) ABSTRACT

A vehicle information detection method, an electronic device and a storage medium are provided, and relates to the technical field of artificial intelligence, in particular to the technical field of computer vision and deep learning. The method includes: determining a bird's-eye view of a target vehicle based on an image of the target vehicle; performing feature extraction on the image of the target vehicle and the bird's-eye view respectively, to obtain first feature information corresponding to the image of the target vehicle and second feature information corresponding to the bird's-eye view of the target vehicle; and determining three-dimensional information of the target vehicle based on the first feature information and the second feature information. According to embodiments of the disclosure, accurate detection of vehicle information can be realized based on a monocular image.

9 Claims, 4 Drawing Sheets

(51) Int. Cl.
*G06T 7/50* (2017.01)
*G06K 9/62* (2022.01)
*G06T 17/00* (2006.01)

(52) U.S. Cl.
CPC .............. *G06T 2207/20081* (2013.01); *G06T 2207/30252* (2013.01)

(56) References Cited

U.S. PATENT DOCUMENTS

2021/0398338 A1* 12/2021 Philion .................. G06V 10/40
2022/0012466 A1* 1/2022 Taghavi ................... G06T 3/60
2022/0012503 A1* 1/2022 Peppoloni ............... G06T 7/246

FOREIGN PATENT DOCUMENTS

| CN | 111160214 A | 5/2020 | |
| EP | 3723001 A1 * | 10/2020 | ........... G01S 17/894 |

OTHER PUBLICATIONS

Joint 3D proposal generation and object detection from view aggregation, Jason Ku et al, IEEE Oct. 2018, pp. 5750-5757 (Year: 2018).*
Dec. 15, 2021—(EP) EESR—App. No. 21181149.2.
Xiaoqing Ye et al., "Monocular 3D Object Detection via Feature Domain Adaptation", Aug. 27, 2020, Computer Vision—ECCV 2020, ISSN, pp. 17-34.
Xinshuo Weng et al., "Monocular 3D Object Detection with Pseudo-LiDAR Point Cloud", 2019 IEEE/CVF International Conference on Computer Vision Workshop, IEEE, Oct. 27, 2019, pp. 857-866.

* cited by examiner

FIG. 6

VEHICLE INFORMATION DETECTION METHOD, ELECTRONIC DEVICE AND STORAGE MEDIUM

CROSS-REFERENCE TO RELATED APPLICATION

This application claims priority to Chinese patent application No. 202011143311.5, filed on Oct. 23, 2020, which is hereby incorporated by reference in its entirety.

TECHNICAL FIELD

The disclosure relates to the field of image processing, in particular to the field of artificial intelligence, more particularly the technical field of computer vision and deep learning.

BACKGROUND

At present, in road and driving scenes, accurate detection of vehicle three-dimensional (3D) information mainly relies on a laser radar or a millimeter wave radar to detect point cloud data of a vehicle.

SUMMARY

The present disclosure provides a vehicle information detection method and apparatus, an electronic device and a storage medium.

According to one aspect of the present disclosure, there is provided a vehicle information detection method, including:
determining a bird's-eye view of a target vehicle based on an image of the target vehicle;
performing feature extraction on the image of the target vehicle and the bird's-eye view respectively, to obtain first feature information corresponding to the image of the target vehicle and second feature information corresponding to the bird's-eye view of the target vehicle; and
determining three-dimensional information of the target vehicle based on the first feature information and the second feature information.

According to another aspect of the present disclosure, there is provided a vehicle information detection apparatus, including:
a first determination module configured for determining a bird's-eye view of a target vehicle based on an image of the target vehicle;
an extraction module configured for performing feature extraction on the image of the target vehicle and the bird's-eye view respectively, to obtain first feature information corresponding to the image of the target vehicle and second feature information corresponding to the bird's-eye view of the target vehicle; and
a second determination module configured for determining three-dimensional information of the target vehicle based on the first feature information and the second feature information.

According to another aspect of the present disclosure, there is provided an electronic device, including:
at least one processor; and
a memory communicatively connected to the at least one processor, wherein
the memory stores instructions executable by the at least one processor, and the instructions are executed by the at least one processor to enable the at least one processor to execute the method provided by embodiments of the present disclosure.

According to another aspect of the present disclosure, there is provided a non-transitory computer-readable storage medium storing computer instructions, wherein the computer instructions cause a computer to perform the method provided by the embodiments of the present disclosure.

It should be understood that the content described in this section is intended neither to identify the key or important features of the embodiments of the present disclosure, nor to limit the scope of the present disclosure. Other features of the present disclosure will be easily understood from the following description.

BRIEF DESCRIPTION OF THE DRAWINGS

The drawings are provided for better understanding of the present disclosure, rather than limiting the present disclosure, wherein.

DETAILED DESCRIPTION

Exemplary embodiments of the present disclosure are described below in combination with the drawings, including various details of the embodiments of the present disclosure to facilitate understanding, which should be considered as exemplary only. Thus, those of ordinary skill in the art should realize that various changes and modifications can be made to the embodiments described here without departing from the scope and spirit of the present disclosure. Likewise, descriptions of well-known functions and structures are omitted in the following description for clarity and conciseness.

Figure 1:
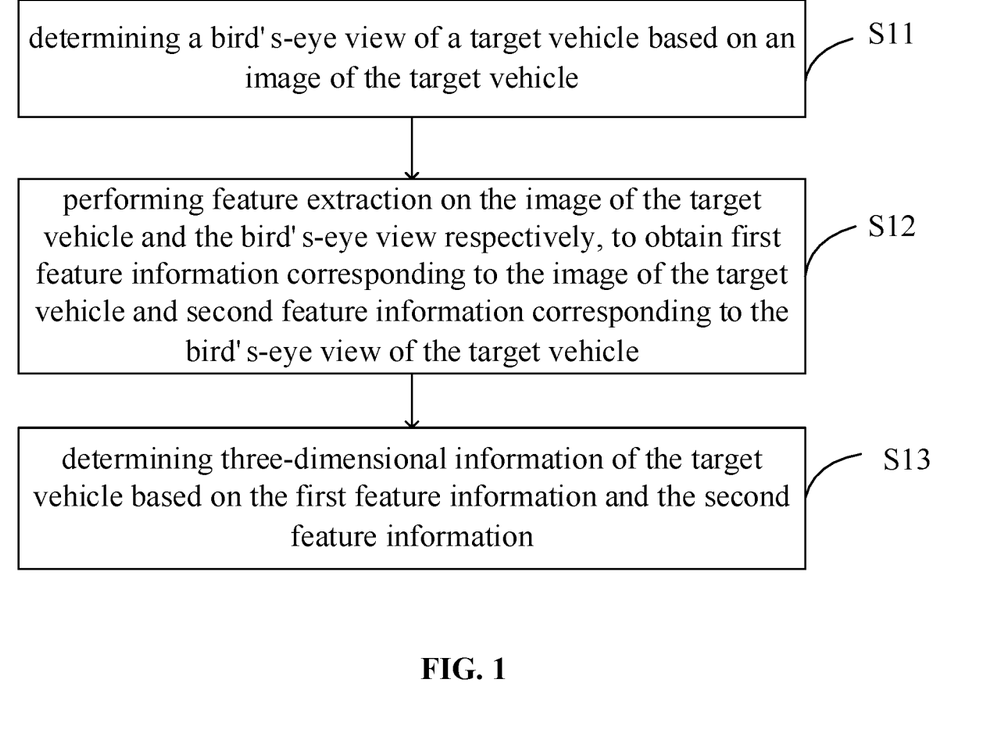
FIG. 1 is a schematic diagram of a vehicle information detection method according to an embodiment of the present disclosure.

FIG. 1 is a schematic diagram of a vehicle information detection method according to an embodiment of the present disclosure. As shown in FIG. 1, the method may include:
S11, determining a bird's-eye view of a target vehicle based on an image of the target vehicle;
S12, performing feature extraction on the image of the target vehicle and the bird's-eye view respectively, to obtain first feature information corresponding to the image of the target vehicle and second feature information corresponding to the bird's-eye view of the target vehicle; and
S13, determining three-dimensional information of the target vehicle based on the first feature information and the second feature information.

As an example, the image of the target vehicle may be a color image such as a Red-Green-Blue (RGB) image. The pixel value of each pixel in the image of the target vehicle may include the color brightness of the pixel in one or more color channels. The image of the target vehicle may be acquired using an image acquisition device disposed on either side of a road, an intersection, or another vehicle around the target vehicle. The image of the target vehicle presents the shape of the target vehicle based on a photographing perspective of the image acquisition device.

The bird's-eye view of the target vehicle may present the shape of the target vehicle from a top view. The pixel value of each pixel point in the bird's-eye view may include the color brightness of the pixel point in one or more color channels, and may also include the depth or other information of the pixel point.

For example, coordinate conversion may be performed on the image of the target vehicle based on a camera internal parameter and/or a camera external parameter of the image acquisition device, to obtain a bird's-eye view. Then, the pixel value of each pixel point in the bird's-eye view is the pixel value of the corresponding pixel point in the image of the target vehicle, including the color brightness in one or more channels.

In the embodiment of the present disclosure, feature extraction is performed on the image of the target vehicle and the bird's-eye view respectively, to obtain the first feature information and the second feature information in different modes. The first feature information corresponding to the image of the target vehicle may contain rich color texture information, the second feature information corresponding to the bird's-eye view can contain more accurate scale information, and the defect of looking small in the distance and big on the contrary is overcome. The first feature information and the second feature information can complement and promote each other.

Therefore, according to the embodiment of the present disclosure, the feature information in different modes may be obtained based on a monocular image, and the feature enhancement is realized by utilizing the feature expression advantages of different modes, so that the vehicle information may be accurately detected based on the monocular image, and the detection cost is reduced.

Exemplary three-dimensional information of the target vehicle may include dimensional information of the target vehicle such as one or more of length, width, and height; pose information such as the actual position and/or orientation angle of the target vehicle in the real world may also be included.

Figure 2:
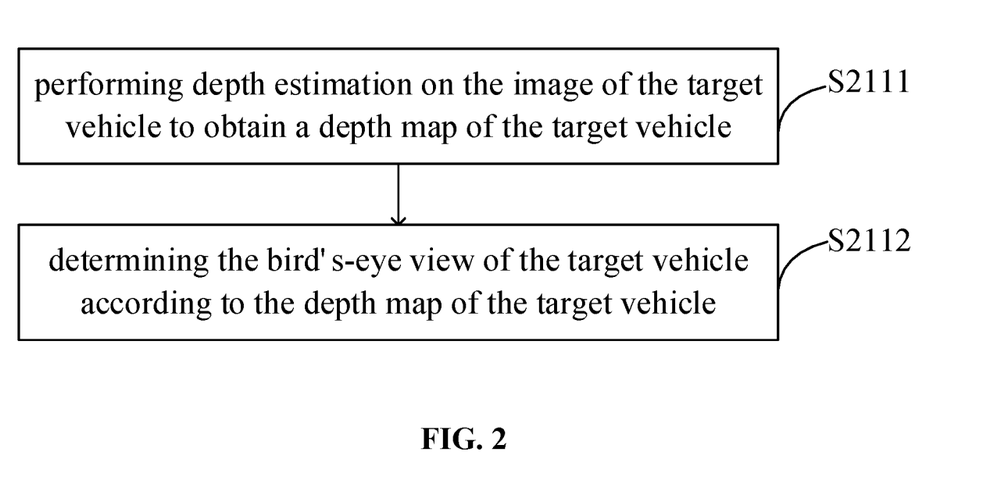
FIG. 2 is a schematic diagram of a vehicle information detection method according to another embodiment of the present disclosure.

In an exemplary embodiment, as shown in FIG. 2, in S11, the determining the bird's-eye view of the target vehicle based on the image of the target vehicle includes:

S2111, performing depth estimation on the image of the target vehicle to obtain a depth map of the target vehicle; and S2112, determining the bird's-eye view of the target vehicle according to the depth map of the target vehicle.

As an example, in the above-mentioned S2111, a depth estimation algorithm such as a Deep Ordinal Regression Network (DORN), DenseDepth and the like may be used to perform depth estimation on the image of the target vehicle to obtain a depth map of the target vehicle, for example, a dense depth map.

The size of the depth map may be the same as that of the image of the target vehicle, and accordingly, each pixel of the depth map may correspond to each pixel of the image of the target vehicle one to one. The pixel value of each pixel point in the depth map includes depth information of the pixel point, so three-dimensional coordinate information of each pixel point may be obtained based on the coordinates and the depth of each pixel point in the depth map, and the bird's-eye view obtained according to the depth map may also contain three-dimensional coordinate information of each pixel point.

Alternatively, in the above S2112, the bird's-eye view of the target vehicle may be obtained by performing coordinate conversion on the depth map of the target vehicle. The bird's-eye view of the target vehicle also may be obtained by performing coordinate conversion on the depth map and the RGB image of the target vehicle respectively, and performing channel connection on the converted characteristic maps.

According to the embodiment, the bird's-eye view of the target vehicle is determined based on the depth map, such that the bird's-eye view may contain three-dimensional coordinate information, thereby improving the detection accuracy and robustness of the three-dimensional information of the vehicle.

In an exemplary embodiment, in S2112, the determining the bird's-eye view of the target vehicle according to the depth map of the target vehicle may include:

performing coordinate conversion on each pixel point of the depth map based on a camera parameter corresponding to the image of the target vehicle, to obtain a three-dimensional point cloud set corresponding to the depth map;

selecting a three-dimensional points within a preset bird's-eye view range from the three-dimensional point cloud set; and obtaining the bird's-eye view of the target vehicle based on the three-dimensional point within the preset bird's-eye view range.

The camera parameter corresponding to the image of the target vehicle may include a camera internal parameter and/or a camera external parameter of an image acquisition device for acquiring the image.

As an example, the performing coordinate conversion on each pixel point of the depth map to obtain the three-dimensional point cloud set corresponding to the depth map may include: performing coordinate conversion on each pixel point of the depth map based on the camera internal parameter to obtain the three-dimensional point cloud set in a camera coordinate system. Alternatively, firstly, coordinate conversion is performed on each pixel point of the depth map based on the camera internal parameter to obtain the three-dimensional point cloud set in the camera coordinate system; and then the three-dimensional point cloud set in the camera coordinate system is converted based on the camera external parameter, to obtain a three-dimensional point cloud set in a ground coordinate system.

For example, coordinate conversion is performed on a pixel point [x, y] of the depth map according to the following coordinate conversion Formula.

$$Z\begin{bmatrix}x\\y\\1\end{bmatrix}=KP=\begin{bmatrix}f_x & 0 & c_x\\ 0 & f_y & c_y\\ 0 & 0 & 1\end{bmatrix}\begin{bmatrix}X\\Y\\Z\end{bmatrix},\quad\text{Formula (1)}$$

wherein $$K=\begin{bmatrix}f_x & 0 & c_x\\ 0 & f_y & c_y\\ 0 & 0 & 1\end{bmatrix}$$

is a camera internal parameter, $f_x$ and $f_y$ are pixel focal lengths in the x direction and the y direction in the camera coordinate system, and $[c_x, c_y]$ is a main point of the camera.

P=[X, Y, Z] is a three-dimensional point corresponding to the pixel point [x, y], in a camera coordinate system. According to Formula (1), the following may be obtained:

$$X = \frac{z(x-c_x)}{f_x};$$

$$Y = \frac{z(y-c_y)}{f_y};$$

$$Z = DepthMap(x, y),$$ Formula (2)

wherein DepthMap (x, y) is a depth value of the pixel point [x, y] in the depth map.

A three-dimensional point cloud set $P_{set}=\{P_i\{X, Y, Z\}$, i=0, 1, ... n\} may be obtained by performing coordinate conversion on all or some of pixel points in the depth map, wherein n is the number of three-dimensional points in the three-dimensional point cloud set.

The three-dimensional point cloud set $P_{set}$ is projected onto the bird's-eye view, to obtain the bird's-eye view of the target vehicle. A bird's-eye view range may be first set, based on which a three-dimensional point may be selected. For example, the bird's-eye view range along the X-axis in the camera coordinate system is set to be −50 m to 50 m, and the bird's-eye view range along the Y-axis is set to be 0 m to 70 m. A three-dimensional point within the bird's-eye view range is selected from the three-dimensional point cloud set $P_{set}$, so as to filter a three-dimensional point far away from the image acquisition device in the three-dimensional point cloud set, such as a three-dimensional point at infinity.

Then, the bird's-eye view of the target vehicle is obtained based on the three-dimensional point within the bird's-eye view range, specifically as follows:

(1) A resolution is set, and pixel coordinates of the bird's-eye view are calculated based on the resolution. For example, the resolution r is set to 0.1 m, 0.1 m, or 0.5 m, etc. Since the three-dimensional point cloud set $P_{set}$ is a set of three-dimensional points in the camera coordinate system, the x direction in the camera coordinate system is the same as the u direction in the bird's-eye view, and the z direction in the camera coordinate system is the same as the v direction in the bird's-eye view, the coordinates of a pixel point [u, v] corresponding to the three-dimensional point P [X, Y, Z] in the three-dimensional point cloud set $P_{set}$, in the bird's-eye view, are as follows:

$$u=X/r;$$

$$v=Z/r.$$ Formula (3)

Optionally, a pixel coordinate origin point in the bird's-eye view is taken as (0, 0), and each pixel point is translated to obtain a translated pixel point [U,V] corresponding to the three-dimensional point P [X, Y, Z] in the three-dimensional point cloud set $P_{set}$ as follows:

$$U=u-\min(u);$$

$$V=v-\min(v),$$ Formula (4)

wherein min (u) is the minimum value of coordinates on the u axis in the bird's-eye view before translation, and min(v) is the minimum value of coordinates on the v axis in the bird's-eye view before translation.

(2) The pixel value of each pixel point in the bird's-eye view is filled. For example, Y value in the three-dimensional point P [X, Y, Z] corresponding to the pixel point [U,V] is normalized and then scaled to [0, 255], to obtain the pixel value of the pixel point [U,V] as follows:

$$BEV(U,=255*Y/(\max(Y)-\min(Y)),$$ Formula (5)

wherein max(Y) is the maximum value of coordinates of three-dimensional points on the Y axis in the bird's-eye view range, and min(Y) is the minimum value of coordinates of the three-dimensional points on the Y axis in the bird's-eye view range.

As an example, if the resolution is set to be low such that one pixel point in the bird's-eye view corresponds to a plurality of three-dimensional points, the maximum value of BEV(U, V) corresponding to the plurality of three-dimensional points may be selected as the pixel value of the pixel point [U, V] in the bird's-eye view after calculating BEV(U, V) corresponding to the plurality of three-dimensional points according to Formula (5).

It can be seen that according to the embodiment, after coordinate conversion is performed on each pixel point of the depth map, a three-dimensional point is selected based on a preset bird's-eye view range, and then a bird's-eye view is obtained based on the selected three-dimensional point, so that a three-dimensional point with a low precision in the distance may be filtered, the accuracy of the bird's-eye view is improved, and the detection accuracy and robustness of the three-dimensional information of the target vehicle are improved.

In an exemplary embodiment, in S12, the performing feature extraction on the image of the target vehicle and the bird's-eye view respectively, to obtain the first feature information corresponding to the image of the target vehicle and the second feature information corresponding to the bird's-eye view of the target vehicle, may include:

performing feature extraction on the image of the target vehicle based on a first feature extraction model, to obtain the first feature information; and performing feature extraction on the bird's-eye view of the target vehicle based on a second feature extraction model, to obtain second feature information.

The first feature extraction model and the second feature extraction model may adopt network structures such as Densely Connected Networks (DenseNet), Residual Network (ResNet), Fully Convolutional Networks (FCN), U-Net and the like.

The first feature extraction model and the second feature extraction model may have the same network structure or different network structures. In the case where the first feature extraction model and the second feature extraction model have the same network structure, the first feature extraction model and the second feature model may contain the same parameter or different parameters. Feature extraction is performed on the image of the target vehicle and the bird's-eye view respectively based on two feature extraction models, so parallel execution may be realized, to improve the detection efficiency, meanwhile, the two feature extraction models adopt the same network structure, to reduce the design complexity of the models.

In an exemplary embodiment, in S13, the determining the three-dimensional information of the target vehicle based on the first feature information and the second feature information includes:

fusing the first feature information and the second feature information to obtain third feature information; and obtaining the three-dimensional information of the target vehicle based on the third feature information.

For example, feature fusion is performed on a high-level feature in the first feature information and a high-level feature in the second feature information, and then three-dimensional information of the target vehicle is predicted based on the fused third feature information.

According to the embodiment, multi-mode feature fusion may be realized, which facilitates complementation and promotion of the first feature information and the second feature information, to realize feature enhancement, so accurate detection of vehicle information can be realized based on a monocular image, and the detection cost is reduced.

Figure 3:
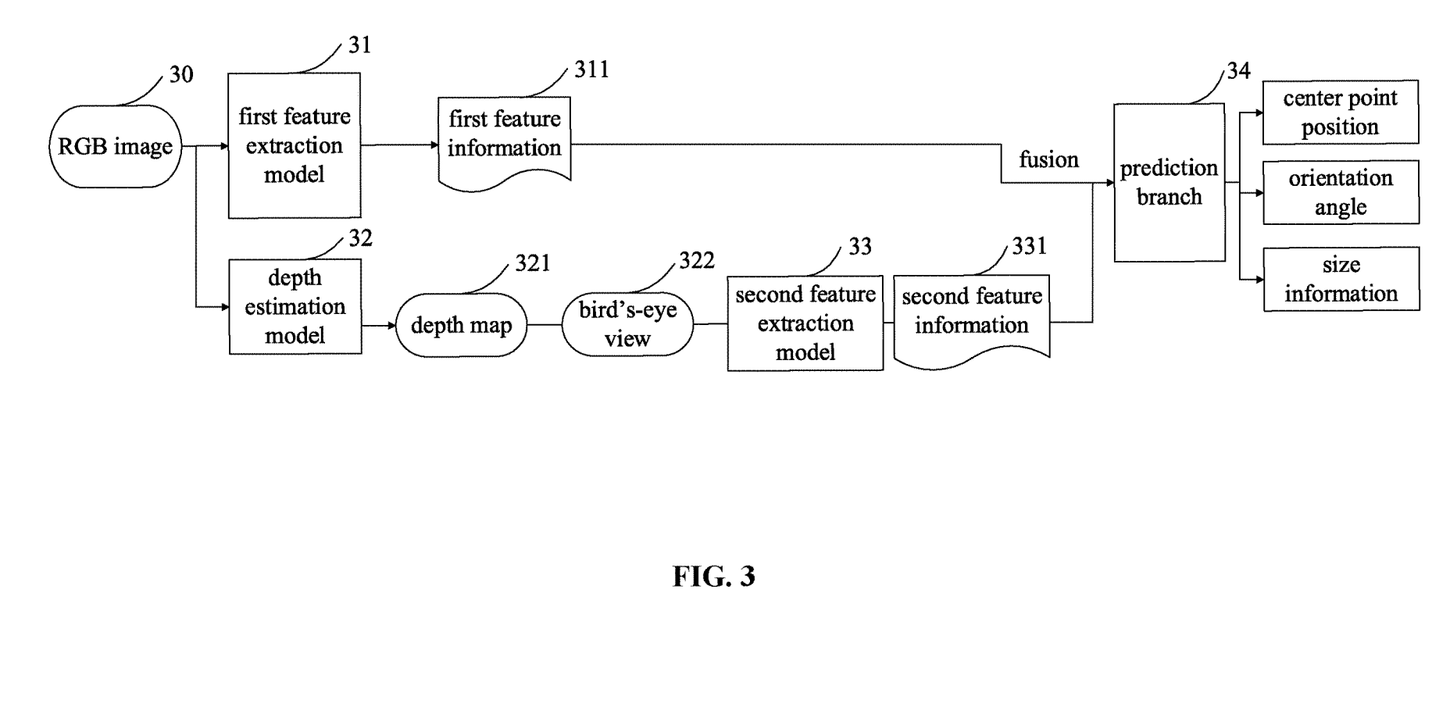
FIG. 3 is a schematic diagram of an application example of a vehicle information detection method according to the present disclosure.

FIG. 3 shows a schematic diagram of an application example of the present disclosure. As shown in FIG. 3, a RGB image 30 of a target vehicle is input into a first feature extraction model 31 and a depth estimation model 32, respectively. The first feature extraction model 31 outputs first feature information 311 corresponding to the RGB image. The depth estimation model 32 outputs a depth map 321 of the target vehicle. Then, the depth map 321 may be converted into a bird's-eye view 322. The bird's-eye view 322 is then input to the second feature extraction model 33, which outputs second feature information 331 corresponding to the bird's-eye view. The first feature information 311 and the second feature information 331 are fused and then input to a prediction branch 34, which outputs three-dimensional information such as the center point position, the size information, the orientation angle and the like of the target vehicle.

The method provided by the embodiment of the present disclosure may be applied to road and driving scenes. Feature information in different modes may be obtained based on a monocular image, and the feature enhancement is realized by utilizing the feature expression advantages of different modes, so that the vehicle information can be accurately detected based on the monocular image, and the detection cost is reduced.

Figure 4:
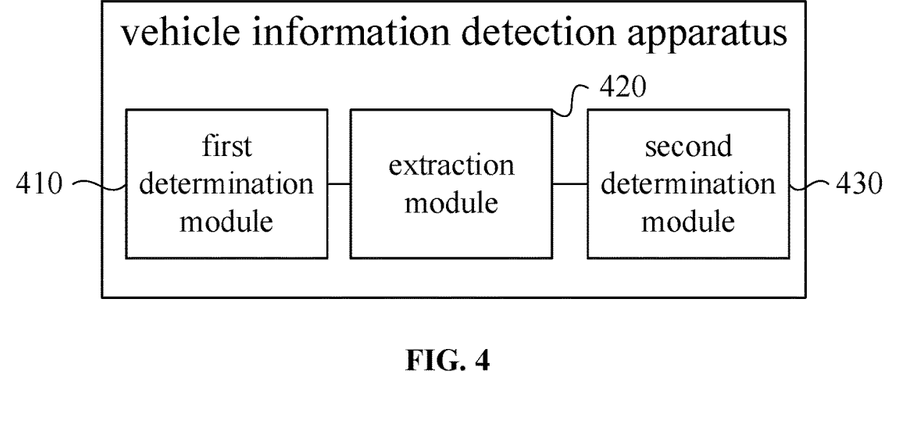
FIG. 4 is a schematic view of a vehicle information detection apparatus according to an embodiment of the present disclosure.

As an implementation of the above method, FIG. 4 shows a schematic diagram of a vehicle information detection apparatus according to an embodiment of the present disclosure. As shown in FIG. 4, the apparatus may include:

a first determination module 410 configured for determining a bird's-eye view of a target vehicle based on an image of the target vehicle;

an extraction module 420 configured for performing feature extraction on the image of the target vehicle and the bird's-eye view respectively, to obtain first feature information corresponding to the image of the target vehicle and second feature information corresponding to the bird's-eye view of the target vehicle; and a second determination module 430 configured for determining three-dimensional information of the target vehicle based on the first feature information and the second feature information.

Figure 5:
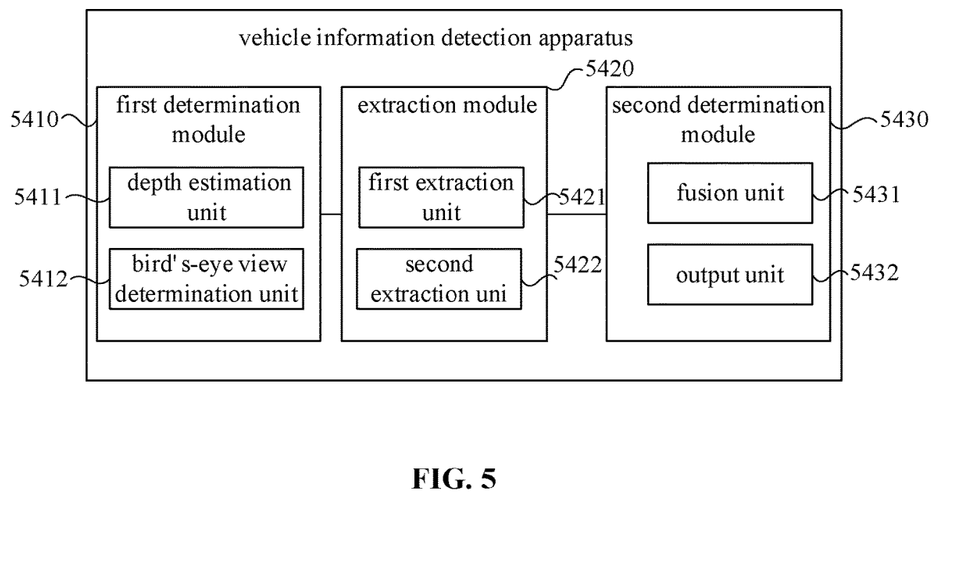
FIG. 5 is a schematic view of a vehicle information detection apparatus according to another embodiment of the present disclosure.

A first determination module 5410, an extraction module 5420 and a second determination module 5430 shown in FIG. 5 are modules same as or similar to the first determination module 410, the extraction module 420 and the second determination module 430 shown in FIG. 4, respectively. Illustratively, as shown in FIG. 5, the first determination module 5410 may include:

a depth estimation unit 5411 configured for performing depth estimation on the image of the target vehicle to obtain a depth map of the target vehicle; and a bird's-eye view determination unit 5412 configured for determining the bird's-eye view of the target vehicle according to the depth map of the target vehicle.

As an example, the bird's-eye view determination unit 5412 may include:

a conversion subunit configured for performing coordinate conversion on each pixel point of the depth map based on a camera parameter corresponding to the image of the target vehicle, to obtain a three-dimensional point cloud set corresponding to the depth map;

a selecting subunit configured for selecting a three-dimensional point within a preset bird's-eye view range from the three-dimensional point cloud set; and a determination subunit configured for obtaining the bird's-eye view of the target vehicle based on the three-dimensional point within the preset bird's-eye view range.

Illustratively, as shown in FIG. 5, the extraction module 5420 may include:

a first extraction unit 5421 configured for performing feature extraction on the image of the target vehicle based on a first feature extraction model, to obtain the first feature information; and a second extraction unit 5422 configured for performing feature extraction on the bird's-eye view of the target vehicle based on the second feature extraction model, to obtain the second feature information, wherein the first feature extraction model and the second feature extraction model have the same network structure.

Illustratively, as shown in FIG. 5, the second determination module 5430 may include:

a fusion unit 5431 configured for fusing the first feature information and the second feature information to obtain third feature information; and an output unit 5432 configured for obtaining the three-dimensional information of the target vehicle based on the third feature information.

In accordance with embodiments of the present disclosure, the present disclosure also provides an electronic device and a readable storage medium.

Figure 6:
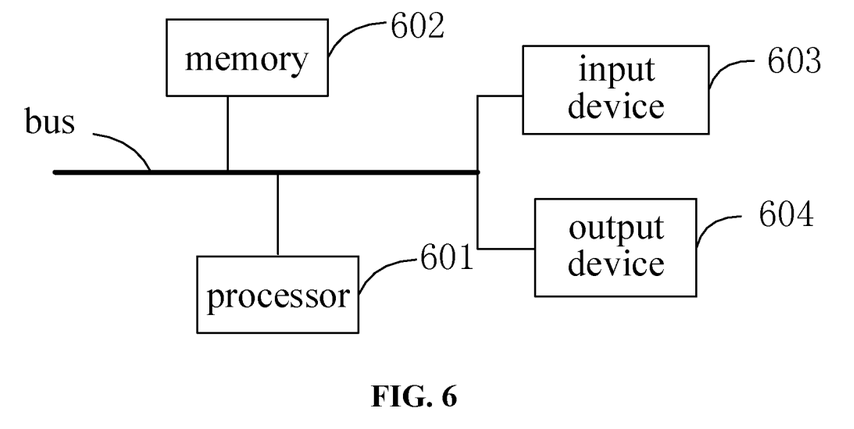
FIG. 6 is a block diagram of an electronic device for implementing a vehicle information detection method according to an embodiment of the present disclosure.

As shown in FIG. 6, a block diagram of an electronic device for implementing a vehicle information detection method according to an embodiment of the present disclosure is shown. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as a personal digital assistant, a cellular telephone, a smart phone, a wearable device, and other similar computing devices. The components shown herein, their connections and relationships, and their functions are by way of example only and are not intended to limit the implementations of the present disclosure described and/or claimed herein.

As shown in FIG. 6, the electronic device includes: one or more processors 601, a memory 602, and interfaces for connecting components, including a high-speed interface and a low-speed interface. The various components are interconnected using different buses and may be mounted on a common motherboard or otherwise as desired. The processor may process instructions for execution within the electronic device, including instructions stored in memory or on memory to display graphical information of the GUI on an external input/output device, such as a display device coupled to the interface. In other embodiments, multiple processors and/or multiple buses may be used with multiple memories, if desired. Similarly, multiple electronic device may be connected, each providing some of the necessary operations (e.g., as an array of servers, a set of blade servers, or a multiprocessor system). An example of a processor 601 is shown in FIG. 6.

The memory 602 is a non-transitory computer-readable storage medium provided herein. The memory stores instructions executable by at least one processor to cause the at least one processor to execute the vehicle information detection method provided herein. The non-transitory computer-readable storage medium of the present disclosure stores computer instructions for causing a computer to perform the vehicle information detection method provided herein.

The memory 602, as a non-transitory computer-readable storage medium, may be used to store non-transitory software programs, non-transitory computer-executable programs, and modules, such as program instructions/modules corresponding to the vehicle information detection method in the embodiment of the present disclosure (e.g., the first determination module 410, the extraction module 420, and the second determination module 430 shown in FIG. 4). The processor 601 executes various functional applications and data processing of the server by running non-transient software programs, instructions, and modules stored in the memory 602, that is, implements the vehicle information detection method in the method embodiments described above.

The memory 602 may include a program storage area and a data storage area, wherein the program storage area may store an application program required by an operating system and at least one function; the data storage area may store data created according to the use of the electronic device for implementing the vehicle information detection method, etc. In addition, the memory 602 may include a high speed random access memory, and may also include a non-transitory memory, such as at least one disk storage device, a flash memory device, or other non-transitory solid state storage device. In some embodiments, the memory 602 may optionally include a memory remotely located relative to the processor 601, which may be connected to the electronic device for implementing the vehicle information detection method via a network. Examples of such networks include, but are not limited to, the Internet, an intranet, a local area network, a mobile communication network, and combinations thereof.

The electronic device for implementing the vehicle information detection method may further include: an input device 603 and an output device 604. The processor 601, the memory 602, the input device 603, and the output device 604 may be connected by a bus or other means, and the bus connection is taken as an example in FIG. 6.

The input device 603 may receive input digital or character information and generate a key signal input related to a user setting and a functional control of the electronic device for implementing the vehicle information detection method. For example, the input device may be a touch screen, a keypad, a mouse, a track pad, a touch pad, a pointer stick, one or more mouse buttons, a track ball, a joystick, and other input devices. The output device 604 may include a display device, an auxiliary lighting device (e.g., a light emitting diode (LED)), a tactile feedback device (e.g., a vibrating motor), etc. The display device may include, but is not limited to, a liquid crystal display (LCD), an LED display, and a plasma display. In some embodiments, the display device may be a touch screen.

Various embodiments of the systems and techniques described herein may be implemented in a digital electronic circuit system, an integrated circuit system, an application specific integrated circuit (ASIC), a computer hardware, a firmware, a software, and/or a combination thereof. These various implementations may include an implementation in one or more computer programs, which can be executed and/or interpreted on a programmable system including at least one programmable processor; the programmable processor may be a dedicated or general-purpose programmable processor and capable of receiving and transmitting data and instructions from and to a storage system, at least one input device, and at least one output device.

These computing programs (also referred to as programs, software, software applications, or codes) may include machine instructions of a programmable processor, and may be implemented using high-level procedural and/or object-oriented programming languages, and/or assembly/machine languages. As used herein, the terms "machine-readable medium" and "computer-readable medium" may refer to any computer program product, apparatus, and/or device (e.g., a magnetic disk, an optical disk, a memory, a programmable logic device (PLD)) for providing machine instructions and/or data to a programmable processor, including a machine-readable medium that receives machine instructions as machine-readable signals. The term "machine-readable signal" may refer to any signal used to provide machine instructions and/or data to a programmable processor.

In order to provide an interaction with a user, the system and technology described here may be implemented on a computer having: a display device (e. g., a cathode ray tube (CRT) or a liquid crystal display (LCD) monitor) for displaying information to the user; and a keyboard and a pointing device (e. g., a mouse or a trackball), through which the user can provide an input to the computer. Other kinds of devices can also provide an interaction with the user. For example, a feedback provided to the user may be any form of sensory feedback (e.g., visual feedback, auditory feedback, or tactile feedback); and an input from the user may be received in any form, including an acoustic input, a voice input or a tactile input.

The systems and techniques described herein may be implemented in a computing system (e.g., as a data server) that may include a background component, or a computing system (e.g., an application server) that may include a middleware component, or a computing system (e.g., a user computer having a graphical user interface or a web browser through which a user may interact with embodiments of the systems and techniques described herein) that may include a front-end component, or a computing system that may include any combination of such background components, middleware components, or front-end components. The components of the system may be connected to each other through a digital data communication in any form or medium (e.g., a communication network). Examples of the communication network may include a local area network (LAN), a wide area network (WAN), and the Internet.

The computer system may include a client and a server. The client and the server are typically remote from each other and typically interact via the communication network. The relationship of the client and the server is generated by computer programs running on respective computers and having a client-server relationship with each other. The server may be a cloud server, also called as a cloud computing server or a cloud host, which is a host product in a cloud computing service system, to solve the defects of difficult management and weak business expansibility in the services of the traditional physical host and the virtual private server (VPS). The server may also be a server of a distributed system, or a server incorporating a blockchain.

According to the technical solution of an embodiment of the present disclosure, feature information in different modes may be obtained based on a monocular image, and the feature enhancement is realized by utilizing the feature expression advantages of different modes, so that the vehicle information can be accurately detected based on the monocular image, and the detection cost is reduced.

It should be understood that the steps can be reordered, added or deleted using the various flows illustrated above. For example, the steps described in the present disclosure may be performed concurrently, sequentially or in a different order, so long as the desired results of the technical solutions disclosed in the present disclosure can be achieved, and there is no limitation herein.

The above-described specific embodiments do not limit the scope of the present disclosure. It will be apparent to those skilled in the art that various modifications, combinations, sub-combinations and substitutions are possible, depending on design requirements and other factors. Any modifications, equivalent substitutions, and improvements within the spirit and principles of the present disclosure are intended to be included within the scope of the present disclosure.

What is claimed is:

1. A vehicle information detection method, comprising:
   determining a bird's-eye view of a target vehicle based on an image of the target vehicle;
   performing feature extraction on the image of the target vehicle and the bird's-eye view respectively, to obtain first feature information corresponding to the image of the target vehicle and second feature information corresponding to the bird's-eye view of the target vehicle; and
   determining three-dimensional information of the target vehicle based on the first feature information and the second feature information;
   wherein the determining the bird's-eye view of the target vehicle based on the image of the target vehicle comprises:
   performing depth estimation on the image of the target vehicle to obtain a depth map of the target vehicle; and
   determining the bird's-eye view of the target vehicle according to the depth map of the target vehicle;
   wherein the determining of the bird's-eye view of the target vehicle according to the depth map of the target vehicle comprises:
   performing coordinate conversion on each pixel point of the depth map based on a camera parameter corresponding to the image of the target vehicle, to obtain a three-dimensional point cloud set corresponding to the depth map;
   selecting a three-dimensional point within a preset bird's-eye view range from the three-dimensional point cloud set and
   obtaining the bird's-eye view of the target vehicle based on the three-dimensional point within the preset bird's-eye view range.

2. The method of claim 1, wherein the performing feature extraction on the image of the target vehicle and the bird's-eye view respectively, to obtain the first feature information corresponding to the image of the target vehicle and the second feature information corresponding to the bird's-eye view of the target vehicle, comprises:
   performing feature extraction on the image of the target vehicle based on a first feature extraction model, to obtain the first feature information; and
   performing feature extraction on the bird's-eye view of the target vehicle based on a second feature extraction model, to obtain the second feature information,
   wherein the first feature extraction model and the second feature extraction model have the same network structure.

3. The method of claim 1, wherein the determining the three-dimensional information of the target vehicle based on the first feature information and the second feature information comprises:
   fusing the first feature information and the second feature information to obtain third feature information; and
   obtaining the three-dimensional information of the target vehicle based on the third feature information.

4. An electronic device, comprising:
   at least one processor; and
   a memory communicatively connected to the at least one processor, wherein
   the memory stores instructions executable by the at least one processor, and the instructions are executed by the at least one processor to enable the at least one processor to perform operations of:
   determining a bird's-eye view of a target vehicle based on an image of the target vehicle;
   performing feature extraction on the image of the target vehicle and the bird's-eye view respectively, to obtain first feature information corresponding to the image of the target vehicle and second feature information corresponding to the bird's-eye view of the target vehicle; and
   determining three-dimensional information of the target vehicle based on the first feature information and the second feature information;
   wherein the determining the bird's-eye view of the target vehicle based on the image of the target vehicle comprises:
   performing depth estimation on the image of the target vehicle to obtain a depth map of the target vehicle; and
   determining the bird's-eye view of the target vehicle according to the depth map of the target vehicle;
   wherein the determining of the bird's-eye view of the target vehicle according to the depth map of the target vehicle comprises:
   performing coordinate conversion on each pixel point of the depth map based on a camera parameter corresponding to the image of the target vehicle, to obtain a three-dimensional point cloud set corresponding to the depth map;
   selecting a three-dimensional point within a preset bird's-eye view range from the three-dimensional point cloud set; and
   obtaining the bird's-eye view of the target vehicle based on the three-dimensional point within the preset bird's-eye view range.

5. The electronic device of claim 4, wherein the performing feature extraction on the image of the target vehicle and the bird's-eye view respectively, to obtain the first feature information corresponding to the image of the target vehicle and the second feature information corresponding to the bird's-eye view of the target vehicle, comprises:
   performing feature extraction on the image of the target vehicle based on a first feature extraction model, to obtain the first feature information; and performing feature extraction on the bird's-eye view of the target vehicle based on a second feature extraction model, to obtain the second feature information, wherein the first feature extraction model and the second feature extraction model have the same network structure.

6. The electronic device of claim 4, wherein the determining the three-dimensional information of the target vehicle based on the first feature information and the second feature information comprises:

fusing the first feature information and the second feature information to obtain third feature information; and obtaining the three-dimensional information of the target vehicle based on the third feature information.

7. A non-transitory computer-readable storage medium having computer instructions stored thereon, wherein the computer instructions cause a computer to perform operations of:

determining a bird's-eye view of a target vehicle based on an image of the target vehicle;

performing feature extraction on the image of the target vehicle and the bird's-eye view respectively, to obtain first feature information corresponding to the image of the target vehicle and second feature information corresponding to the bird's-eye view of the target vehicle; and determining three-dimensional information of the target vehicle based on the first feature information and the second feature information;

wherein the determining the bird's-eye view of the target vehicle based on the image of the target vehicle comprises:

performing depth estimation on the image of the target vehicle to obtain a depth map of the target vehicle; and determining the bird's-eye view of the target vehicle according to the depth map of the target vehicle;

wherein the determining of the bird's-eye view of the target vehicle according to the depth map of the target vehicle comprises:

performing coordinate conversion on each pixel point of the depth map based on a camera parameter corresponding to the image of the target vehicle, to obtain a three-dimensional point cloud set corresponding to the depth map;

selecting a three-dimensional point within a preset bird's-eye view range from the three-dimensional point cloud set; and obtaining the bird's-eye view of the target vehicle based on the three-dimensional point within the preset bird's-eye view range.

8. The non-transitory computer-readable storage medium of claim 7, wherein the performing feature extraction on the image of the target vehicle and the bird's-eye view respectively, to obtain the first feature information corresponding to the image of the target vehicle and the second feature information corresponding to the bird's-eye view of the target vehicle, comprises:

performing feature extraction on the image of the target vehicle based on a first feature extraction model, to obtain the first feature information; and performing feature extraction on the bird's-eye view of the target vehicle based on a second feature extraction model, to obtain the second feature information, wherein the first feature extraction model and the second feature extraction model have the same network structure.

9. The non-transitory computer-readable storage medium of claim 7, wherein the determining the three-dimensional information of the target vehicle based on the first feature information and the second feature information comprises:

fusing the first feature information and the second feature information to obtain third feature information; and obtaining the three-dimensional information of the target vehicle based on the third feature information.

* * * * *